(12) United States Patent
Wang et al.

(10) Patent No.: US 11,706,813 B2
(45) Date of Patent: Jul. 18, 2023

(54) RANDOM ACCESS METHOD AND APPARATUS, AND METHOD AND APPARATUS FOR SENDING PLMN IDENTITY

(71) Applicant: BEIJING XIAOMI MOBILE SOFTWARE CO., LTD., Beijing (CN)

(72) Inventors: Liping Wang, Beijing (CN); Cheng Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 39 days.

(21) Appl. No.: 17/323,871

(22) Filed: May 18, 2021

(65) Prior Publication Data
US 2022/0183067 A1 Jun. 9, 2022

(30) Foreign Application Priority Data
Dec. 4, 2020 (CN) .......................... 202011416456.8

(51) Int. Cl.
*H04W 74/08* (2009.01)
*H04W 76/11* (2018.01)
*H04W 48/16* (2009.01)
*H04W 84/04* (2009.01)

(52) U.S. Cl.
CPC ....... *H04W 74/0833* (2013.01); *H04W 48/16* (2013.01); *H04W 76/11* (2018.02); *H04W 84/042* (2013.01)

(58) Field of Classification Search
CPC . H04W 48/16; H04W 84/02; H04W 74/0833; H04W 76/11; H04W 84/042
See application file for complete search history.

(56) References Cited

U.S. PATENT DOCUMENTS 10,681,501 B2 * 6/2020 Byun ................... H04W 88/08
2016/0353361 A1 12/2016 Jung et al.

OTHER PUBLICATIONS

European Patent Application No. 21176018.6 extended Search and Opinion dated Nov. 25, 2021, 9 pages.

* cited by examiner

*Primary Examiner* — Diane D Mizrahi
(74) *Attorney, Agent, or Firm* — Cozen O'Connor

(57) ABSTRACT

A random access method for a terminal includes: receiving a system message broadcasted by a target base station and initiating random access to the target base station; in response to a failure of the random access, determining a first operator to which the target base station belongs based on a first PLMN identity in the plurality of PLMN identities; and in response to a second operator, to which the terminal belongs, being different from the first operator, stopping a random access retry to the target base station and initiating random access to other base station except the target base station. The system message includes a plurality of public land mobile network (PLMN) identities with an order relationship.

11 Claims, 3 Drawing Sheets

S201
determining a first PLMN identity corresponding to a first operator to which the base station belongs S202
broadcasting a system message including a plurality of PLMN identities with an order relationship, wherein the first PLMN identity in the plurality of PLMN identities is the determined first PLMN identity

RANDOM ACCESS METHOD AND APPARATUS, AND METHOD AND APPARATUS FOR SENDING PLMN IDENTITY

CROSS REFERENCE TO RELATED APPLICATIONS

This application claims priority to Chinese Patent Application No. 202011416456.8, filed on Dec. 4, 2020, the content of which is incorporated herein by reference in its entirety.

TECHNICAL FIELD

The present disclosure relates to the field of mobile communications, and in particular to a random access method and a random access method apparatus, and a method and an apparatus for sending a PLMN identity.

BACKGROUND

Currently, sharing and co-constructing wireless cellular networks is the development trend of operators. For example, a plurality of different operators can share the same base station, thereby increasing network coverage for each operator and reducing the costs of construction and operation for operators.

However, sharing base stations will also lead to new issues. For example, when a terminal accesses a shared base station of a non-home operator, it is easy to cause an access failure due to compatibility issues. In this case, the terminal cannot successfully access the shared base station after a plurality of repeated access attempts. Therefore, the terminal may be in a state where its service is unavailable for a long time, with poor user experience.

SUMMARY

According to a first aspect of the present disclosure, a random access method for a terminal includes: receiving a system message broadcasted by a target base station, and initiating random access to the target base station, wherein the system message includes a plurality of public land mobile network (PLMN) identities with an order relationship; in response to a failure of the random access, determining a first operator, to which the target base station belongs, based on a first PLMN identity in the plurality of PLMN identities; and in response to a second operator, to which the terminal belongs, being different from the first operator, stopping a random access retry to the target base station and initiating random access to other base station except the target base station.

According to a second aspect of the present disclosure, a method for sending a PLMN identity is applicable to a base station and includes: determining a first PLMN identity corresponding to a first operator to which the base station belongs; and broadcasting a system message including a plurality of PLMN identities with an order relationship, wherein the first PLMN identity in the plurality of PLMN identities is the first PLMN identity.

According to a third aspect of the present disclosure, a terminal includes a processor and a memory for storing instructions executable by the processor. The processor is configured to receive a system message broadcasted by a target base station, and initiate random access to the target base station; determine a first operator to which the target base station belongs based on a first PLMN identity in the plurality of PLMN identities, in response to a failure of the random access; and stop a random access retry to the target base station and initiate random access to other base station except the target base station, in response to a second operator to which the terminal belongs being different from the first operator. The system message includes a plurality of public land mobile network (PLMN) identities with an order relationship.

BRIEF DESCRIPTION OF THE DRAWINGS

The accompanying drawings herein are incorporated into the specification and constitute a part of the specification, show embodiments in conformity with embodiments of the present disclosure, and explain the principle of the present disclosure together with the specification.

DETAILED DESCRIPTION

Figure 1:
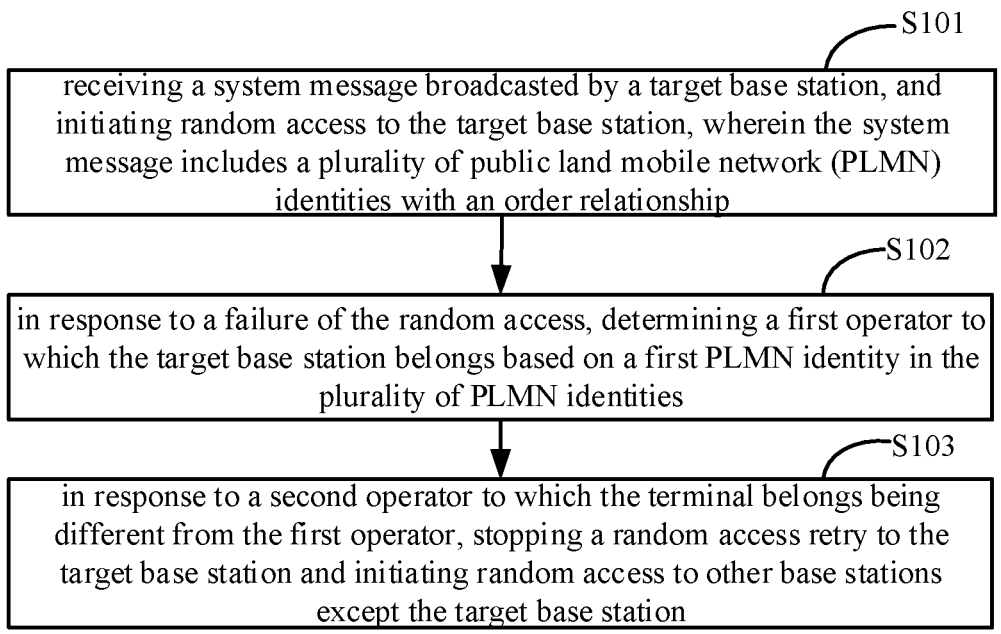
FIG. 1 is a schematic flowchart illustrating a random access method according to an exemplary embodiment of the disclosure.

Exemplary embodiments will be described in detail below, examples of which are illustrated in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. On the contrary, they are only examples of apparatuses and methods consistent with some aspects of the present disclosure.

The terms used in the disclosure are only for the purpose of describing specific embodiments, and are not intended to limit the present disclosure. The singular forms of "a", "said" and "the" used in the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used in the disclosure to describe various information, these information should not be limited to these terms. These terms are only used to distinguish the same type of information from each other. For example, without departing from the scope of the present disclosure, a first information may also be referred to as a second information. Similarly, the second information may also be referred to as the first information. Depending on the context, the word "if" as used herein may be interpreted as "when . . . " or "upon . . . " or "in response to determining . . . ".

In the traditional mobile communication network, different operators build their own communication networks independently, and use their own base stations independently. The base station may indicate the operator to which said base station belongs through the order relationship of the public land mobile network (PLMN) identities included in the system message, so that the terminal may determine the operator to which said base station belongs based on the PLMN identities in the system message. It should be noted that, the operator to which the base station belongs in the embodiment may be an operator that actually constructs the base station, or may also be an operator to which the base station belongs determined in other ways.

With the development of mobile communication networks, the situation is widely existed where a plurality of operators share the base stations. For example, the base station A constructed by the operator A may be shared to the operator B, the operator C, etc. for simultaneous use.

However, there are also problems at the shared base stations. When a terminal accesses a non-home operator, some compatibility issues are prone to occur. For example, for the above-mentioned base station A, it is easy to cause an access failure due to compatibility issues when a terminal for the operator B accesses this base station. According to the solution in the related art, the terminal may retry the access for a plurality of times until the upper limit of the number of retries is reached. However, it is usually difficult to quickly solve the compatibility issue of the terminal accessing the non-home operator. Even if the terminal retries for a plurality of times, it may not successfully access in general. Therefore, the terminal may be in a state where its service is unavailable for a long time, with poor user experience.

In view of this, the present disclosure proposes a random access method, which may avoid long-term service unavailability caused by a failure of the access due to the compatibility issues.

FIG. 1 is a schematic flowchart illustrating a random access method according to an exemplary embodiment of the disclosure. The random access method illustrated in the embodiment may be applicable to a terminal. The terminal includes but is not limited to an electronic device such as a mobile phone, a tablet computer, a wearable device, a sensor, and an Internet of Things device. The terminal may be used as a user equipment to communicate with a base station and a core network. The base station include but is not limited to a 2G base station, a 3G base station, a 4G base station, and a 5G base station. The core network include but is not limited to a 2G core network, a 3G core network, and a 4G Core network and a 5G core network.

As illustrated in FIG. 1, the random access method may include the following blocks S101-S103.

In block S101, a system message broadcasted by a target base station is received, and random access is initiated to the target base station. The system message includes a plurality of public land mobile network (PLMN) identities with an order relationship.

In an embodiment, the communication between the terminal and the network requires a signal transmission by the base station. Therefore, the terminal first needs to access a target cell where it is currently located. The signal transmission is then performed through a target base station for the target cell.

It should be noted that, a cell is an area whose signal coverage is performed by a base station or a part of a base station. In an embodiment, when the terminal accesses the target cell (in fact, the terminal accesses a target base station whose signal range covers the target cell). For the convenience of description, the word "cell" below will not be distinguished from the word "base station".

In an embodiment, the terminal needs to access the base station in many situations, such as a cell selection, a cell reselection, a cell handover, a cell redirection. When it is determined that the terminal needs to access the base station, a cell search may be performed. In response to receiving the system message sent by the target base station, relevant information of the target base station may be obtained based on the system message, and the random access is initiated to the target base station. Optionally, the terminal may first determine whether the target base station meets a preset condition, for example, determine whether signal strength of the target base station is greater than a preset threshold. If the preset condition is met, the random access may be initiated to the target base station. If the preset condition is not met, it may continue to search other cells.

In an embodiment, the system message broadcasted by the base station may include a PLMN identity. The PLMN identity consists of two parts, one is a mobile country code (MCC), which may be used to identify the country to which it belongs, and the other is a mobile network code (MNC), which may be used to identify the mobile communication network to which it belongs. Generally speaking, different operators correspond to different MNCs.

In an embodiment, for a base station shared by a plurality of operators, said base station may enable a plurality of PLMN identities included in a system message. Each PLMN identity corresponds to one operator.

In an embodiment, the base station may distinguish operators with the order of PLMN identities. For example, when the base station may enable the plurality of PLMN identities included in the system message, a first PLMN identity of a first operator to which the base station belongs is ranked in the first place while other PLMN identities of other operators sharing the same base station are ranked behind the first PLMN identity. The first operator to which the base station belongs may be the operator who firstly builds the base station.

In an embodiment, when the base station determines the PLMN identities that need to be included in the system message, it may first determine the first PLMN identity of the first operator and a number of third PLMN identities of third operators sharing the base station. Then the first PLMN identity is ranked firstly and the number of third PLMN identities are ranked behind the first PLMN identity. The number of third PLMN identities may be ranked randomly or based on a preset priority.

For example, if the first operator to which the base station belongs is the operator A corresponding to the PLMN identity "46000" and the operator B (corresponding to the PLMN identity "46001") shares the base station together with the operator C (corresponding to the PLMN identity "46003") at the same time, the base station may carry the three PLMN identities at the same time. For example, "46000", "46001", and "46003" are included in the system information block (SIB1) of the system message.

In an embodiment, the terminal may receive the system message sent by the base station, and parse the system message to determine a plurality of PLMN identities, and then may determine the operator to which the base station belongs based on the order relationship of the plurality of PLMN identities.

In an embodiment, in response to the successful random access of the terminal to the target base station, the terminal may perform subsequent steps according to the method in the related art, such as establishing an attachment with the core network.

In an embodiment, in response to a failure of the random access of the terminal to the target base station, the terminal may perform block S102.

In block S102, in response to a failure of the random access, a first operator, to which the target base station belongs, is determined based on a first PLMN identity in the plurality of PLMN identities.

In an embodiment, the terminal may determine the first operator to which the target base station belongs based on the first PLMN identity in the plurality of PLMN identities included in the system message. For example, the terminal may save a corresponding relationship between the PLMN identity and the operator in advance and query the first operator corresponding to the first PLMN identity in the corresponding relationship.

In block S103, in response to a second operator to which the terminal belongs being different from the first operator, stopping a random access retry to the target base station and initiating random access to other base station except the target base station. In an embodiment, the terminal may read operator identity information from a SIM or UIM card, in which the identity information may indicate that the terminal belongs to the second operator. For example, the terminal may read the operator identity information from the SIM or UIM card when it is turned on. In an embodiment, the operator identity information read by the terminal may be a PLMN identity (such as the MNC) or other identities, etc., and the corresponding relationship between the preset operator identity and the operator is then queried to determine the second operator to which the terminal belongs.

It should be noted that, the terminal in the embodiment may be a multi-card terminal, where the multi-card may belong to the same operator or different operators. The operator to which the terminal belongs in the embodiment may be determined based on the SIM card in the terminal corresponding to the target base station. For example, the terminal may be a dual-card terminal equipped with a first SIM card and a second SIM card. If the terminal initiates random access to the target base station through the first SIM card, the terminal may read the operator identity information from the first SIM card.

In an embodiment, the terminal may determine whether the first operator and the second operator are the same operator.

In an embodiment, in response to the first operator being the same as the second operator, the terminal may perform processing according to the access procedure in the related art. For example, the terminal may initiate a random access retry to the target base station. Alternatively, the terminal may stop the random access retry to the target base station and restart a cell search to access a new cell searched when the times of access retries reaches the preset threshold.

It may be understood that, when the first operator is the same as the second operator, the terminal may determine that a failure of the access is not due to a compatibility issue caused by different operators, so that the random access failed due to other reasons (such as network fluctuations) may be avoided by retrying the random access, thereby improving the efficiency of random access.

In an embodiment, if the terminal determines that the second operator is different from the first operator, the terminal no longer initiates the random access retry to the target base station, and initiates new random access to other base station.

In an embodiment, the terminal may restart a cell search. If the searched cell meets a preset condition, for example, the signal strength meets a preset threshold, random access to the searched cell may be initiated.

It may be understood that, when the first operator is different from the second operator, the terminal judges that a failure of the access may be due to a compatibility issue caused by different operators and the possibility that a access retry may solve the compatibility issue is not high. Therefore, in order to access the network as soon as possible, the terminal does not initiate new random access to the target base station, but initiates the new random access to other base station instead, thereby avoiding the terminal in a state where its service is unavailable for a long time.

So far, the embodiment illustrated in FIG. 1 is completed. According to the embodiment illustrated in FIG. 1, the terminal may determine the operator to which the base station belongs based on the PLMN identity broadcasted by the base station. In the embodiment, the order relationship of the PLMN identity is configured to indicate the operator to which the base station belongs, without adding other parameters or identities, etc., which may save communication resources and improve communication efficiency. At the same time, when the operator to which the base station belongs is different from the operator to which the terminal belongs, the terminal may stop the random access retry in time to prevent the terminal from being offline for a long time due to a plurality of access retry failures, thereby improving the efficiency of terminal access and improving the user experience.

In an embodiment, a prohibited list may be set in the terminal, where the prohibited list is configured to prohibit the terminal from initiating random access to base stations in the prohibited list.

In an embodiment, in case that the random access is failed, the terminal may add the target base station to the prohibited list in response to the second operator to which the terminal belongs being different from the first operator. For example, the identity of the target base station may be added to the prohibited list. Later, when the terminal accesses the base station, the base station may first query whether it is in the prohibited list. If it is in the prohibited list, the base station will not initiate the random access to the base station, may search again and continue to determine whether to access other base stations searched.

In an embodiment, when the terminal initiates random access to a base station other than the target base station, it may restart a cell search to determine a base station to be accessed; in response to the base station to be accessed being not in the prohibited list, random access is initiated to the base station to be accessed.

It may be understood that, the terminal may filter out some base stations that may have compatibility issues through the prohibited list to avoid access failure, thereby improving the efficiency of accessing the network.

Figure 2:
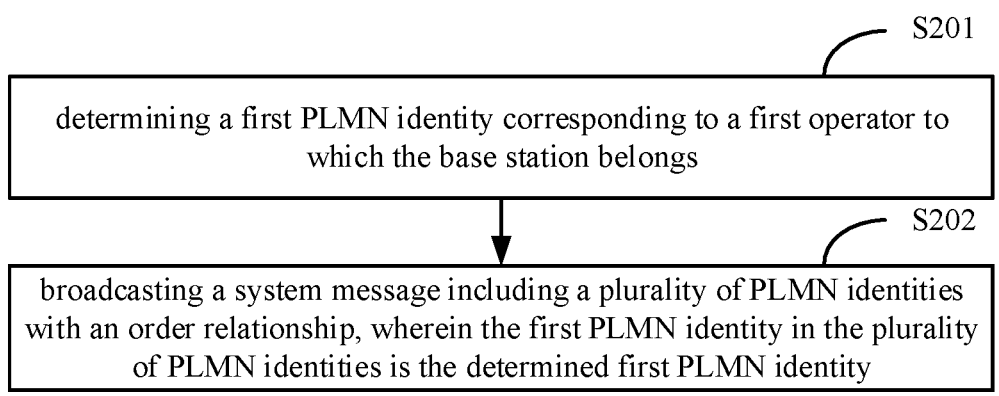
FIG. 2 is a schematic flowchart illustrating a method for sending a PLMN identity according to an exemplary embodiment of the disclosure.

FIG. 2 is a schematic flowchart illustrating a method for sending a PLMN identity according to an exemplary embodiment of the disclosure. The random access method illustrated in the embodiment may be applicable to a base station. The base station includes but is not limited to a 4G base station, a 5G base station and a 6G base station. The base station may communicate with a terminal served as a user equipment. The terminal includes but is not limited to an electronic device such as a mobile phone, a tablet computer, a wearable device, a sensor, and an Internet of Things device. In an embodiment, the terminal may be the terminal to which the random access method described in any of the above embodiments is applicable.

As illustrated in FIG. 2, the random access method may include the following blocks S201-S202.

In block S201, a first PLMN identity corresponding to a first operator to which the base station belongs is determined.

In an embodiment, the base station constructed by the first operator may be shared to several other operators.

In an embodiment, the base station may first determine the first operator that constructs the base station, and then determine the PLMN identity of the first operator. In an embodiment, the base station may also directly determine the PLMN identity corresponding to the first operator constructing the base station.

For example, the base station may store configuration information for saving related information such as the PLMN identity of the first operator who built the base station and other operators sharing the base station. Alternatively, the base station may also query the core network for related information such as the PLMN identity.

In block S202, a system message including a plurality of PLMN identities with an order relationship is broadcast. The first PLMN identity in the plurality of PLMN identities corresponds to the first operator.

In an embodiment, the base station may enable a plurality of PLMN identities included in the system message, where each PLMN identity corresponds to an operator.

In an embodiment, in order to identify the first operator to which the base station belongs, the base station may arrange the first operator in the first place among the plurality of PLMN identities. For example, the plurality of PLMN identities may be in the form of a list, and the first in the list is the first PLMN identity corresponding to the first operator.

Of course, the base station may also identify the first operator to which it belongs in other ways. For example, an additional indication identity of the operator may be included to indicate the first operator to which the base station belongs.

In an embodiment, the terminal may receive the system message sent by the base station, and then determine the first operator to which the base station belongs based on the PLMN identities with the order relationship included in the system message.

So far, the embodiment illustrated in FIG. 2 is completed. According to the embodiment illustrated in FIG. 2, the base station may indicate the operator to which the base station belongs through the order relationship, without adding additional identities or parameters, etc., which not only allows the terminal to determine the operator to which the base station belongs, but also saves communication resources and improves communication efficiency.

Figure 3:
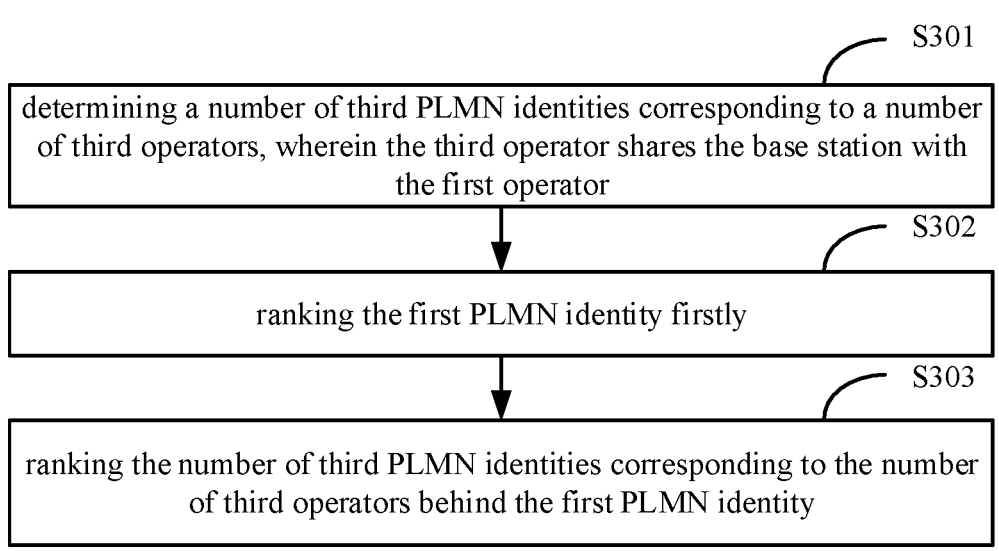
FIG. 3 is a schematic flowchart illustrating a method for determining a PLMN identity according to an exemplary embodiment of the disclosure.

In an embodiment, the base station may determine the PLMN identity needed to be included in the system message by using the method illustrated in FIG. 3.

FIG. 3 is a schematic flowchart illustrating a method for determining a PLMN identity according to an exemplary embodiment of the disclosure.

As illustrated in FIG. 3, it includes the following blocks S301-S303.

In block S301, a number of third PLMN identities corresponding to third operators are determined. The third operator shares the base station with the first operator.

In an embodiment, the base station may obtain a number of third PLMN identities. The third PLMN identities correspond to the third operators that share the base station with the first operator.

For example, the base station may first determine the third operators, and then determine the third PLMN identity corresponding to each of the third operators; alternatively, the base station may also directly obtain the third PLMN identity, for example by querying the core network or querying the preset configuration information, etc.

In block S302, the first PLMN identity is ranked firstly.

In block S303, the number of third PLMN identities corresponding to the third operators are ranked behind the first PLMN identity.

In an embodiment, the base station ranks the first PLMN identity and the third PLMN identities, i.e., the first PLMN identity is ranked firstly and the number of third PLMN identities are ranked behind the first PLMN identity. Optionally, the plurality of third PLMN identities may be ranked randomly or based on a preset priority.

So far, the embodiment illustrated in FIG. 3 is completed. It should be noted that the method illustrated in FIG. 3 at least exemplifies that other methods may also be used to determine the PLMN identity included in the system message in practical applications, which is not limited in the embodiment.

Corresponding to the above embodiments of the random access method, the present disclosure also provides embodiments of a random access apparatus.

Figure 4:
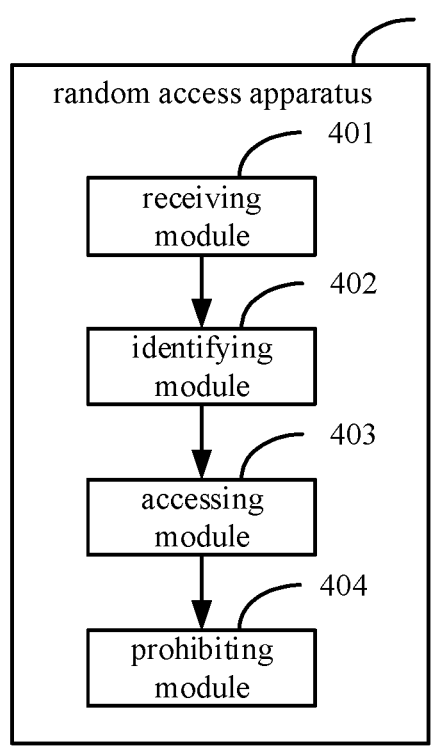
FIG. 4 is a schematic diagram illustrating a random access apparatus according to an exemplary embodiment of the disclosure.

FIG. 4 is a schematic diagram illustrating a random access apparatus according to an exemplary embodiment of the disclosure. The random access apparatus illustrated in the embodiment may be applicable to a terminal. The terminal includes but is not limited to an electronic device such as a mobile phone, a tablet computer, a wearable device, a sensor, and an Internet of Things device. The terminal may be used as a user equipment to communicate with a base station and a core network. The base station include but is not limited to a 2G base station, a 3G base station, a 4G base station, and a 5G base station. The core network include but is not limited to a 2G core network, a 3G core network, and a 4G Core network and a 5G core network.

As illustrated in FIG. 4, the random access apparatus may include a receiving module 401, an identifying module 402 and an accessing module 403.

The receiving module 401 is configured to receive a system message broadcasted by a target base station, and initiate random access to the target base station. The system message includes a plurality of public land mobile network (PLMN) identities with an order relationship.

The identity module 402 is configured to determine a first operator to which the target base station belongs based on the first PLMN identity in the plurality of PLMN identities, in response to a failure of the random access.

The accessing module 403 is configured to stop a random access retry to the target base station and initiate random access to other base station except the target base station, in response to a second operator to which the terminal belongs being different from the first operator.

In an embodiment, the random access apparatus includes a prohibiting module 404. The prohibiting module is configured to add the target base station to a prohibited list. The prohibited list is configured to prohibit the terminal from initiating random access to base stations in the prohibited list.

In an embodiment, when the random access to other base station except the target base station is initiated, the accessing module is further configured to: restart a cell search to determine a base station to be accessed; and initiate random access to the base station to be accessed in response to the base station to be accessed being not in the prohibited list.

In an embodiment, the accessing module 403 is configured to: initiate the random access retry to the target base station in response to the second operator to which the terminal belongs being the same as the first operator.

Corresponding to the above embodiments of the method for sending a PLMN identity, the present disclosure also provides embodiments of an apparatus for sending a PLMN identity.

Figure 5:
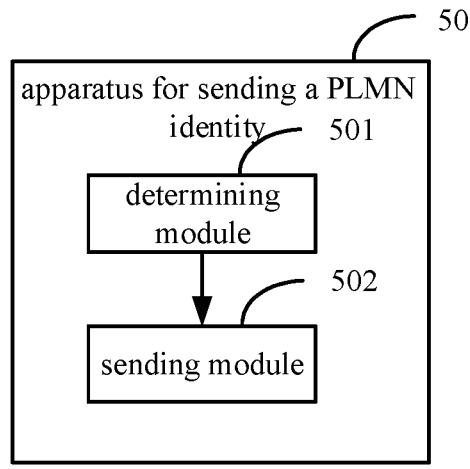
FIG. 5 is a schematic diagram illustrating an apparatus for sending a PLMN identity according to an exemplary embodiment of the disclosure.

FIG. 5 is a schematic diagram illustrating an apparatus for sending a PLMN identity according to an exemplary embodiment of the disclosure.

As illustrated in FIG. 5, the apparatus for sending the PLMN identity may include a determining module 501 and a sending module 502.

The determining module 501 is configured to determine a first PLMN identity corresponding to a first operator to which the base station belongs.

The sending module 502 is configured to broadcast a system message including a plurality of PLMN identities with an order relationship. The first PLMN identity in the plurality of PLMN identities is the first PLMN identity.

In an embodiment, when the plurality of PLMN identities with the order relationship are determined, the sending module is further configured to: determine a number of third PLMN identities corresponding to third operators, wherein the third operator shares the base station with the first operator; rank the first PLMN identity firstly; and rank the number of third PLMN identities corresponding to the third operators behind the first PLMN identity.

Regarding the apparatus in the above embodiment, the specific manner in which each module performs the operation has been described in detail in the embodiment of the method, which will not be elaborated here.

For the apparatus embodiment, since it basically corresponds to the method embodiment, the relevant part may refer to the part of the description of the method embodiment. The apparatus embodiments described above are merely illustrative, where the units described as separate components may or may not be physically separated, and the components displayed as units may or may not be physical units. That is, they may be located in one place or may be distributed to a plurality of network units. Some or all of the modules may be selected according to actual needs, to achieve the objectives of the solutions of the present disclosure. Those skilled in the art may understand and implement without creative work.

Correspondingly, the present disclosure also provides an electronic device, which includes a processor and a memory for storing instructions executable by the processor. The processor is configured to implement the random access method and/or the method for sending the PLMN identity as described in any of the above embodiments. For example, the method may include: receiving a system message broadcasted by a target base station, and initiating random access to the target base station, wherein the system message includes a plurality of public land mobile network (PLMN) identities with an order relationship; in response to a failure of the random access, determining a first operator to which the target base station belongs based on the first PLMN identity in the plurality of PLMN identities; and in response to a second operator to which the terminal belongs being different from the first operator, stopping a random access retry to the target base station and initiating random access to other base station except the target base station.

Correspondingly, the present disclosure also provides a computer-readable storage medium having computer instructions stored thereon. When the instructions are executed by a processor, the random access method and/or the method for sending the PLMN identity as described in any of the above embodiments are implemented. For example, the method may include: receiving a system message broadcasted by a target base station, and initiating random access to the target base station, wherein the system message includes a plurality of public land mobile network (PLMN) with an order relationship; in response to a failure of the random access, determining a first operator to which the target base station belongs based on the first PLMN identity in the plurality of PLMN identities; and in response to a second operator to which the terminal belongs being different from the first operator, stopping a random access retry to the target base station and initiating random access to other base station except the target base station.

Figure 6:
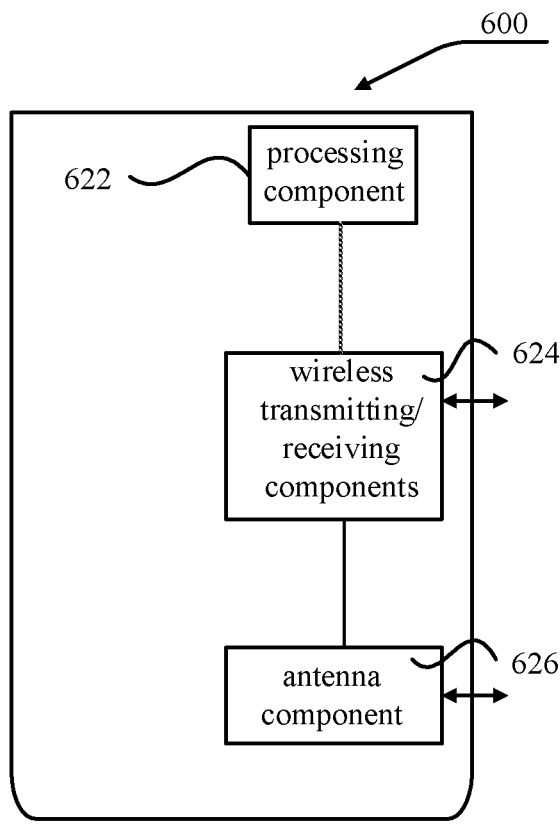
FIG. 6 is a schematic block diagram illustrating a device for sending a PLMN identity according to an exemplary embodiment of the disclosure.

As illustrated in FIG. 6, it is a schematic block diagram illustrating a device for sending a PLMN identity according to an exemplary embodiment of the disclosure. The device 600 may be provided as a base station. Referring to FIG. 6, the device 600 includes a processing component 622, a wireless transmitting/receiving component 624, an antenna component 626, and a signal processing part specific to a wireless interface. The processing component 622 may further include one or more processors. One of the processors in the processing component 622 may be configured to implement the method for sending the PLMN identity described in any of the above embodiments.

Figure 7:
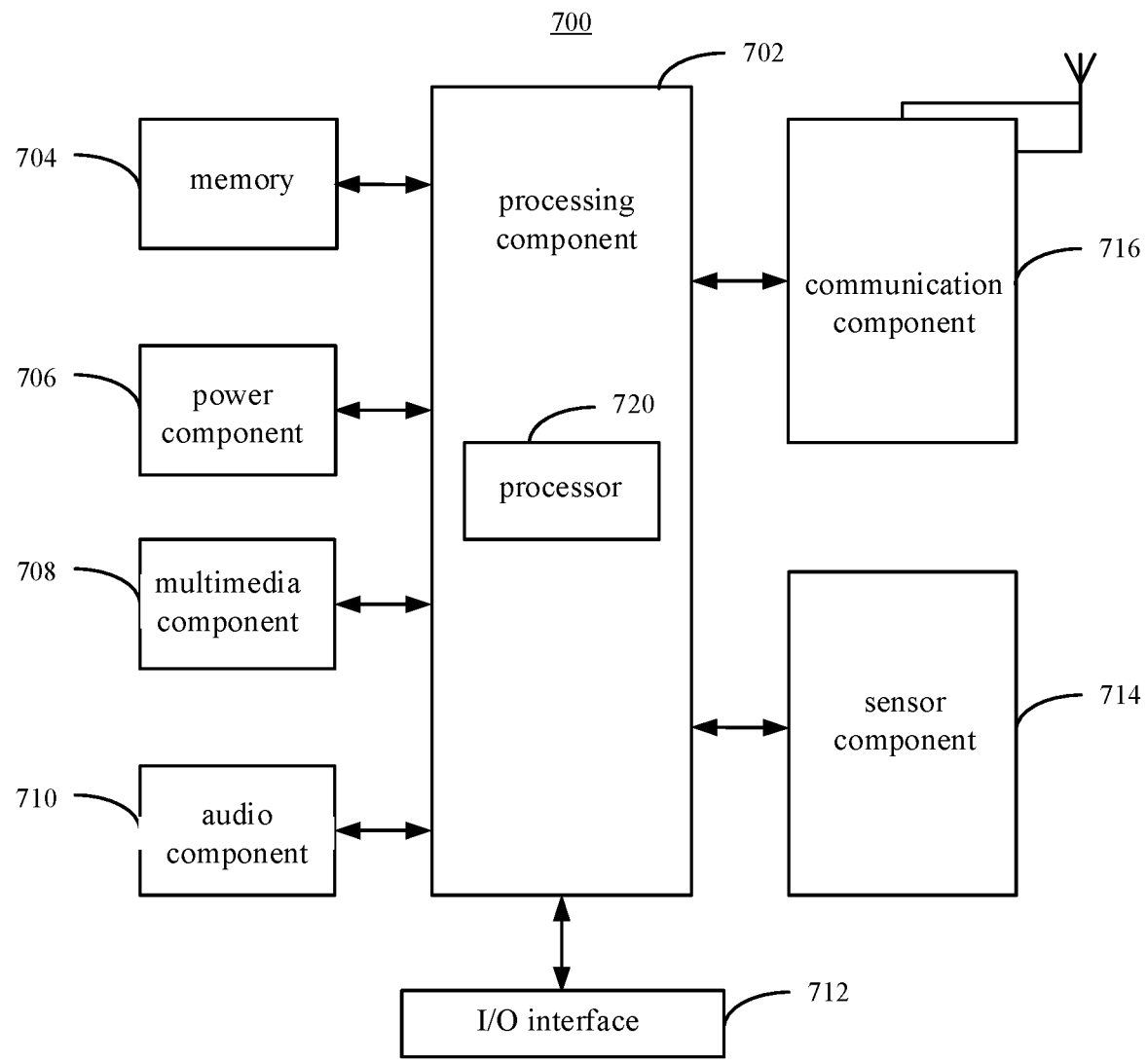
FIG. 7 is a schematic block diagram illustrating a random access device according to an exemplary embodiment of the disclosure.

FIG. 7 is a schematic block diagram illustrating a random access device according to an exemplary embodiment of the disclosure. The device 700 may be a mobile phone, a computer, a digital broadcasting terminal, a messaging device, a game console, a tablet device, a medical device, a fitness equipment, a personal digital assistant, etc.

Referring to FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 typically controls the overall operations of the device 700, such as the operations associated with display, telephone calls, data communications, camera operations, and recording operations. The processing component 702 may include one or more processors 720 to execute instructions to perform all or part of the steps of the above described random access methods. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support operations in the device 700. Examples of such data include instructions for any application or method operating on the device 700, contact data, phone book data, messages, pictures, videos, etc. The memory 704 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 706 provides power to various components of the device 700. The power supply component 706 may include a power management system, one or more power sources, and other components associated with the generation, management, and distribution of power for the device 700.

The multimedia component 708 includes a screen that provides an output interface between the device 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and the peripheral interface module. The peripheral interface module may be a keyboard, a click wheel, a button, and the like. These buttons may include but are not limited to, a home button, a volume button, a starting button, and a locking button.

The sensor component 714 includes one or more sensors for providing the device 700 with various aspects of state evaluation. For example, the sensor component 714 may detect an open/closed state of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G or 3G, 4G LTE, 5G NR or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In an exemplary embodiment, the device 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above-described random access methods.

In exemplary embodiments, there is also provided a non-transitory computer-readable storage medium including instructions, such as the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

Those skilled in the art will easily think of other embodiments of the present disclosure after considering the description and practicing the invention disclosed herein. The present disclosure is intended to cover any variations, uses, or adaptive changes of the present invention which follow the general principles of the present disclosure and include common knowledge or conventional technical means in the art not disclosed in the present disclosure. The description and the embodiments are to be regarded as exemplary only, and the true scope of the present disclosure are indicated in the appended claims.

It should be understood that the present disclosure is not limited to the precise structure described above and illustrated in the drawings, and various modifications and changes may be made without departing from its scope. The scope of the present invention is only limited by the appended claims.

The above contents are only preferred embodiments of the present disclosure and are not intended to limit the present disclosure. Any modification, equivalent replacement, improvement, etc. made within the principle of the present disclosure shall be included in the protection scope of the present disclosure.

What is claimed is:

1. A random access method, for a terminal, comprising:
receiving a system message broadcasted by a target base station, and initiating random access to the target base station, wherein the system message includes a plurality of public land mobile network (PLMN) identities with an order relationship;
in response to a failure of the random access, determining a first operator to which the target base station belongs based on a first PLMN identity in the plurality of PLMN identities; and
in response to a second operator, to which the terminal belongs, being different from the first operator, stopping a random access retry to the target base station and initiating random access to other base station except the target base station.

2. The method of claim 1, wherein in response to the second operator to which the terminal belongs being different from the first operator, the method further comprises:
adding the target base station to a prohibited list, wherein the prohibited list is configured to prohibit the terminal from initiating random access to base stations in the prohibited list.

3. The method of claim 2, wherein the initiating the random access to other base station except the target base station comprises:
restarting a cell search to determine a base station to be accessed; and
in response to the base station to be accessed being not in the prohibited list, initiating random access to the base station to be accessed.

4. The method of claim 1, wherein the method further comprises:
in response to the second operator to which the terminal belongs being the same as the first operator, initiating the random access retry to the target base station.

5. The method of claim 1, wherein identity information of the second operator is read from a SIM or UIM card of the terminal.

6. A computer-readable storage medium having computer instructions stored thereon, when the instructions are executed by a processor, the random access method according to claim 1 is implemented.

7. A terminal, comprising:
a processor; and
a memory for storing instructions executable by the processor;
wherein the processor is configured to receive a system message broadcasted by a target base station, and initiate random access to the target base station, wherein the system message includes a plurality of public land mobile network (PLMN) identities with an order relationship;
determine a first operator to which the target base station belongs based on a first PLMN identity in the plurality of PLMN identities, in response to a failure of the random access; and
stop a random access retry to the target base station and initiate random access to other base station, except the target base station, in response to a second operator to which the terminal belongs being different from the first operator.

8. The terminal of claim 7, wherein in response to the second operator to which the terminal belongs being different from the first operator, the processor is further configured to:
add the target base station to a prohibited list, wherein the prohibited list is configured to prohibit the terminal from initiating random access to base stations in the prohibited list.

9. The terminal of claim 8, wherein when the random access to other base station except the target base station is initiated, the processor is further configured to:
restart a cell search to determine a base station to be accessed; and
initiate random access to the base station to be accessed in response to the base station to be accessed being not in the prohibited list.

10. The terminal of claim 7, wherein the processor is further configured to:
initiate the random access retry to the target base station in response to the second operator, to which the terminal belongs, being the same as the first operator.

11. The terminal of claim 7, wherein identity information of the second operator is read from a SIM or UIM card of the terminal.

* * * * *